US011399132B2

(12) United States Patent
Matsuda

(10) Patent No.: US 11,399,132 B2
(45) Date of Patent: Jul. 26, 2022

(54) ELECTRONIC APPARATUS, IMAGE CAPTURE APPARATUS, METHOD FOR CONTROLLING THE SAME, AND STORAGE MEDIUM

(71) Applicant: CANON KABUSHIKI KAISHA, Tokyo (JP)

(72) Inventor: Araki Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/998,513

(22) Filed: Aug. 20, 2020

(65) Prior Publication Data

US 2021/0067687 A1 Mar. 4, 2021

(30) Foreign Application Priority Data

Aug. 30, 2019 (JP) .............................. JP2019-158669

(51) Int. Cl.
*H04N 5/232* (2006.01)
*G06F 16/58* (2019.01)
*G06F 16/583* (2019.01)
*G06F 16/54* (2019.01)

(52) U.S. Cl.
CPC ......... *H04N 5/23222* (2013.01); *G06F 16/54* (2019.01); *G06F 16/583* (2019.01); *G06F 16/5866* (2019.01)

(58) Field of Classification Search
CPC .................................................. H04N 5/23222
USPC ...................................................... 348/222.1
See application file for complete search history.

(56) References Cited

FOREIGN PATENT DOCUMENTS

JP     2004-297197 A    10/2004
JP     2004297197    *  10/2004

* cited by examiner

*Primary Examiner* — Joel W Fosselman
(74) *Attorney, Agent, or Firm* — Canon U.S.A., Inc. IP Division

(57) ABSTRACT

An electronic apparatus connected to an image capture apparatus receives an image capture instruction for requesting the image capture apparatus to perform image capture processing, in response to a user operation. If the image capture instruction is received, the electronic apparatus performs control to display a first image recorded by the image capture apparatus performing the image capture processing according to a capture request based on the image capture instruction from the electronic apparatus on a screen without a second image recorded by the image capture apparatus automatically performing the image capture processing according to satisfying a predetermined condition for automatic capturing. If the image capture instruction is not received, the electronic apparatus performs control to display both the first image and the second image on the screen.

20 Claims, 7 Drawing Sheets

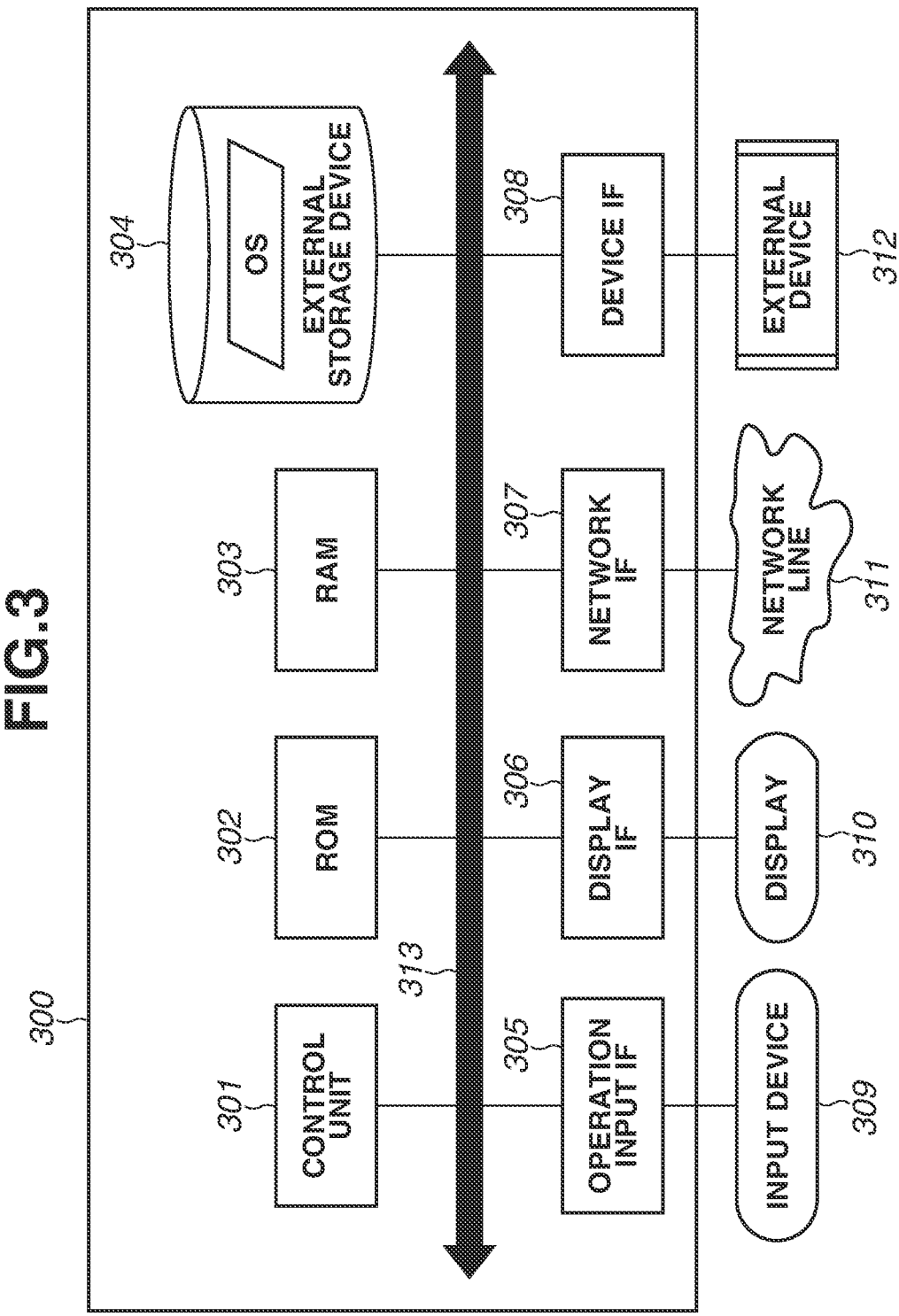

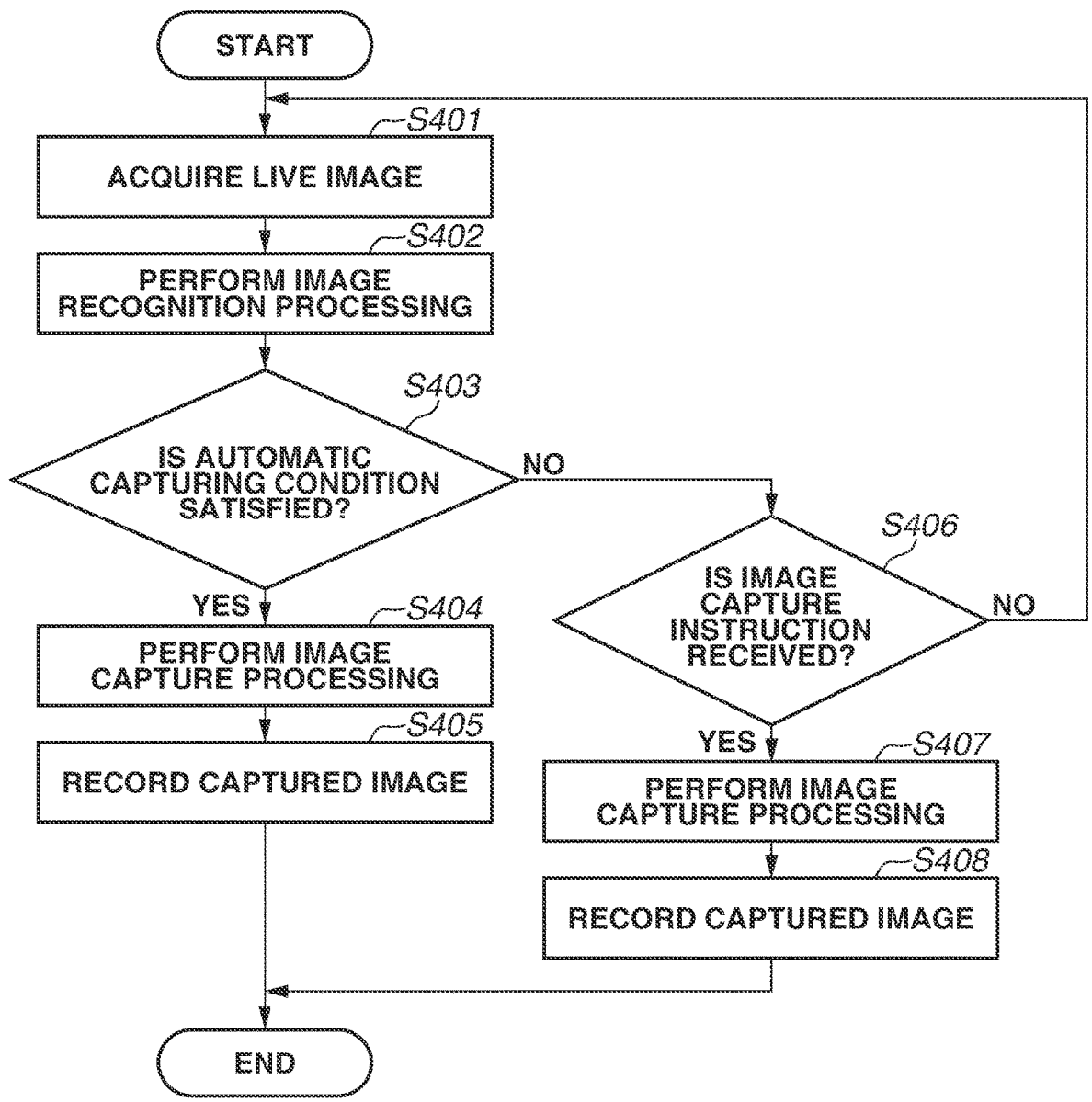

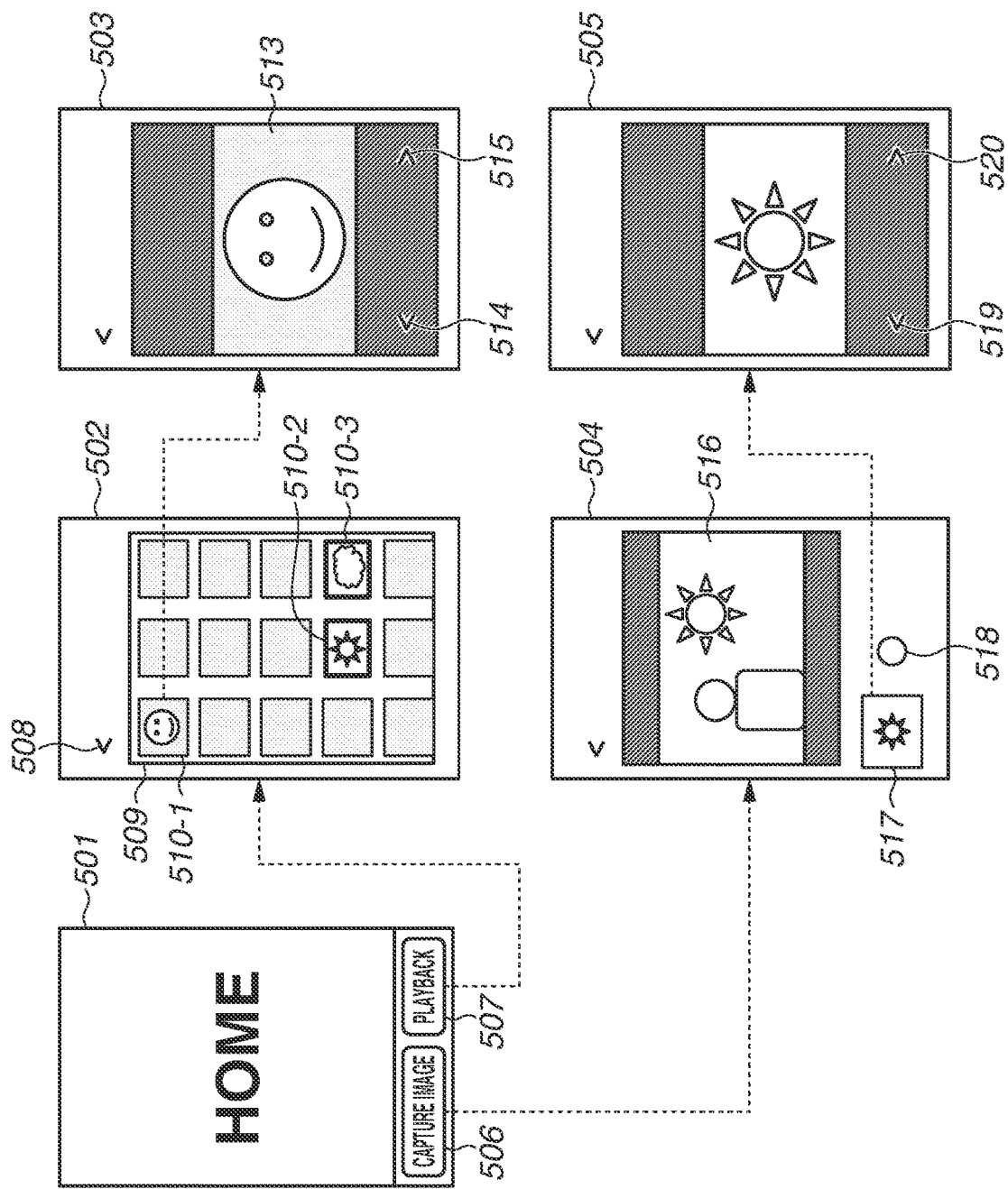

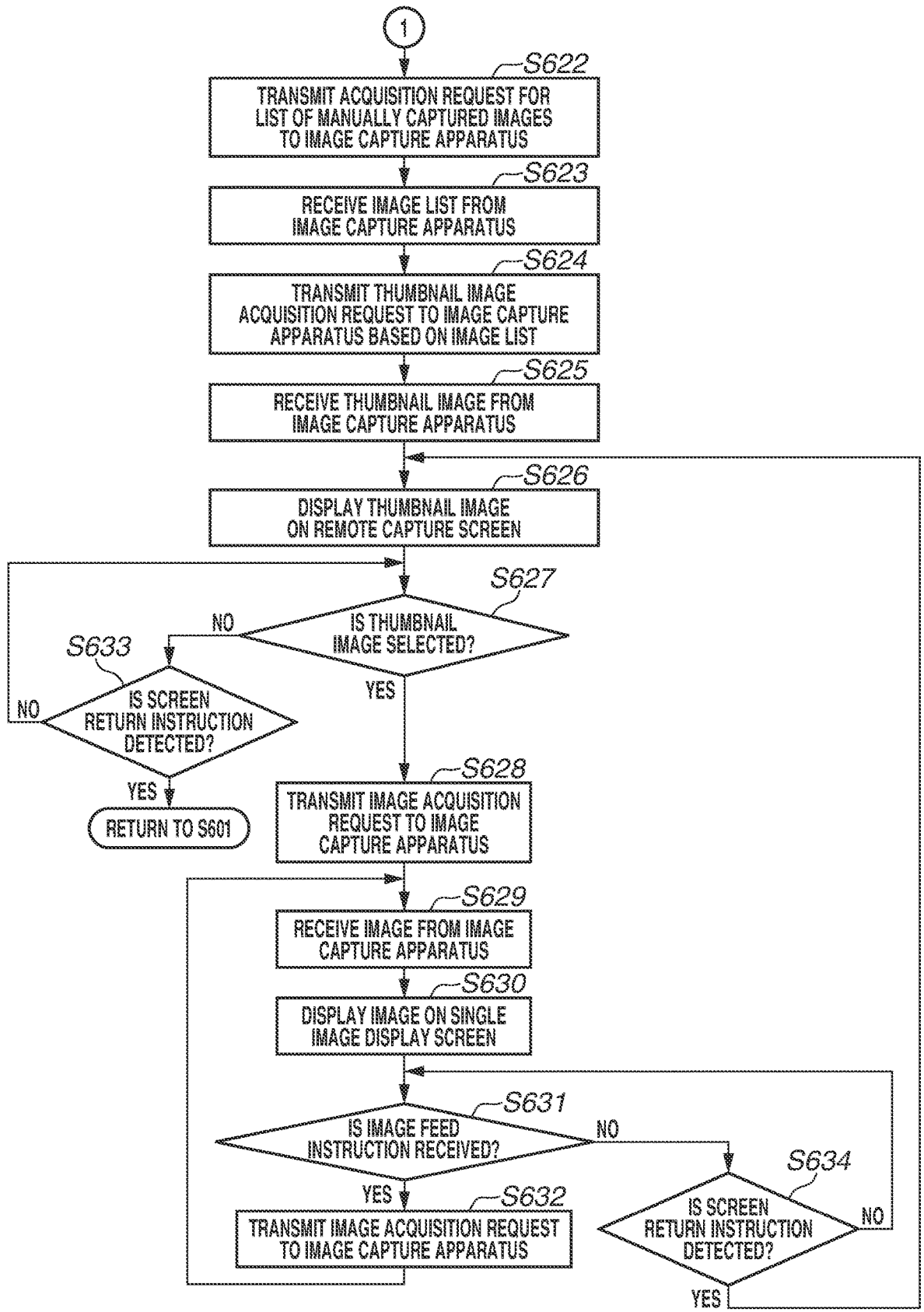

ical apparatus, IMAGE
CAPTURE APPARATUS, METHOD FOR
CONTROLLING THE SAME, AND STORAGE
MEDIUM

BACKGROUND

Field of the Disclosure

The present disclosure relates to a technique for displaying content on a screen.

Description of the Related Art

A conventional image capture apparatus has a manual capture function to capture images in response to an operation of an image capturing person, and may have an automatic capture function to automatically capture images in a pre-registered scene, as discussed in Japanese Patent Application Laid-Open No. 2004-297197.

When an image capture apparatus has both the manual capture function and the automatic capture function, a manually captured image and an automatically captured image are recorded together. Therefore, if the recorded images are played back and displayed, the manually captured image and the automatically captured image are played back and displayed in a mixed manner, and it may take time to search for a desired image according to a purpose of a user. For example, if a user tries to check a previously manually captured image while performing manual capturing, it may take time to find a desired image, which hinders the image capturing.

SUMMARY

According to an aspect of some embodiments, an electronic apparatus connected to an image capture apparatus includes an instruction unit configured to receive an image capture instruction for requesting the image capture apparatus to perform image capture processing, in response to a user operation, a request unit configured to transmit an acquisition request for acquiring an image, to the image capture apparatus, the image being recorded by the image capture apparatus performing the image capture processing either according to a capture request based on the image capture instruction from the electronic apparatus or according to satisfying a predetermined condition for automatic capturing, a reception unit configured to receive the image from the image capture apparatus, a display control unit configured to perform control to display the received image on a screen. If the instruction unit receives the image capture instruction, a first image recorded by the image capture apparatus performing the image capture processing according to the capture request based on the image capture instruction is displayed on the screen without a second image recorded by the image capture apparatus automatically performing the image capture processing according to satisfying the predetermined condition. If the instruction unit does not receive the image capture instruction, both the first image and the second image are displayed on the screen.

According to another aspect of some embodiments, an image capture apparatus connected to an electronic apparatus includes a first recording unit configured to record a first image in a recording medium in association with trigger information indicating manual capturing, the first image being obtained by image capture processing performed according to a user instruction, a second recording unit configured to record a second image in the recording medium in association with trigger information indicating automatic capturing, the second image being obtained by the image capture processing performed when a predetermined condition is satisfied, a reception unit configured to receive an acquisition request for at least one of the first image and the second image from the electronic apparatus, a reading unit configured to read at least one of the first image and the second image from the recording medium according to the received acquisition request, and a transmission unit configured to transmit at least one of the read first image and the read second image to the electronic apparatus.

Further features of various embodiments will become apparent from the following description of exemplary embodiments with reference to the attached drawings.

BRIEF DESCRIPTION OF THE DRAWINGS

FIG. 3 is a block diagram illustrating an example of a configuration of an electronic apparatus according to an exemplary embodiment.

FIG. 4 is a flowchart illustrating an example of an operation performed by the image capture apparatus according to an exemplary embodiment.

FIG. 5 illustrates an example of a screen displayed on a display of the electronic apparatus according to an exemplary embodiment.

FIGS. 6A and 6B are flowcharts each illustrating an example of an operation performed by the electronic apparatus according to an exemplary embodiment.

DESCRIPTION OF THE EMBODIMENTS

An exemplary embodiment will be described in detail below with reference to the drawings. However, constituent elements described in the exemplary embodiment are merely illustrative, and are not intended to limit the scope of all embodiments only thereto.

Figure 1:
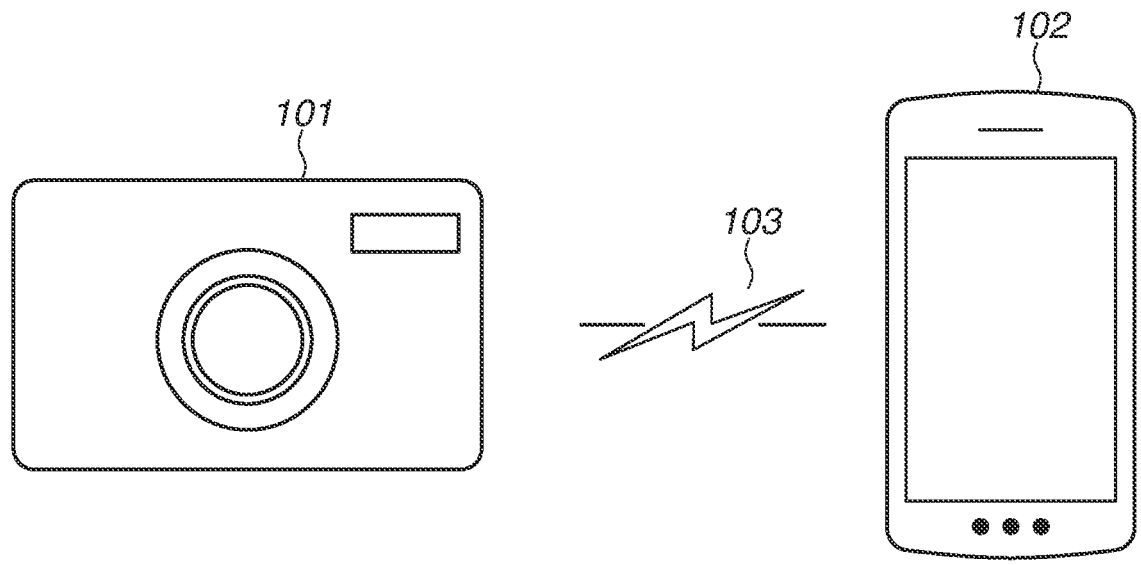
FIG. 1 illustrates an example of a configuration of an image capture system according to an exemplary embodiment.

FIG. 1 illustrates an example of a configuration of an image capture system 100 according to an exemplary embodiment. An image capture apparatus 101 and an electronic apparatus 102 are communicably connected to each other via a wireless local area network (LAN) or Bluetooth (registered trademark) 103. An image capturing person operates the image capture apparatus 101 to capture an image (which is referred to as manual capturing), and also operates the electronic apparatus 102 to transmit an instruction to the image capture apparatus 101 to capture an image (which is referred to as remote manual capturing). Furthermore, the image capture apparatus 101 captures an image according to preset conditions without an operation by the image capturing person (which is referred to as automatic capturing). In addition, the image capturing person operates the electronic apparatus 102 to transmit an image request to the image capture apparatus 101, receives the image obtained by the above-described capturing from the image capture apparatus 101, and plays back and displays the image on a screen of the electronic apparatus 102.

Figure 2:
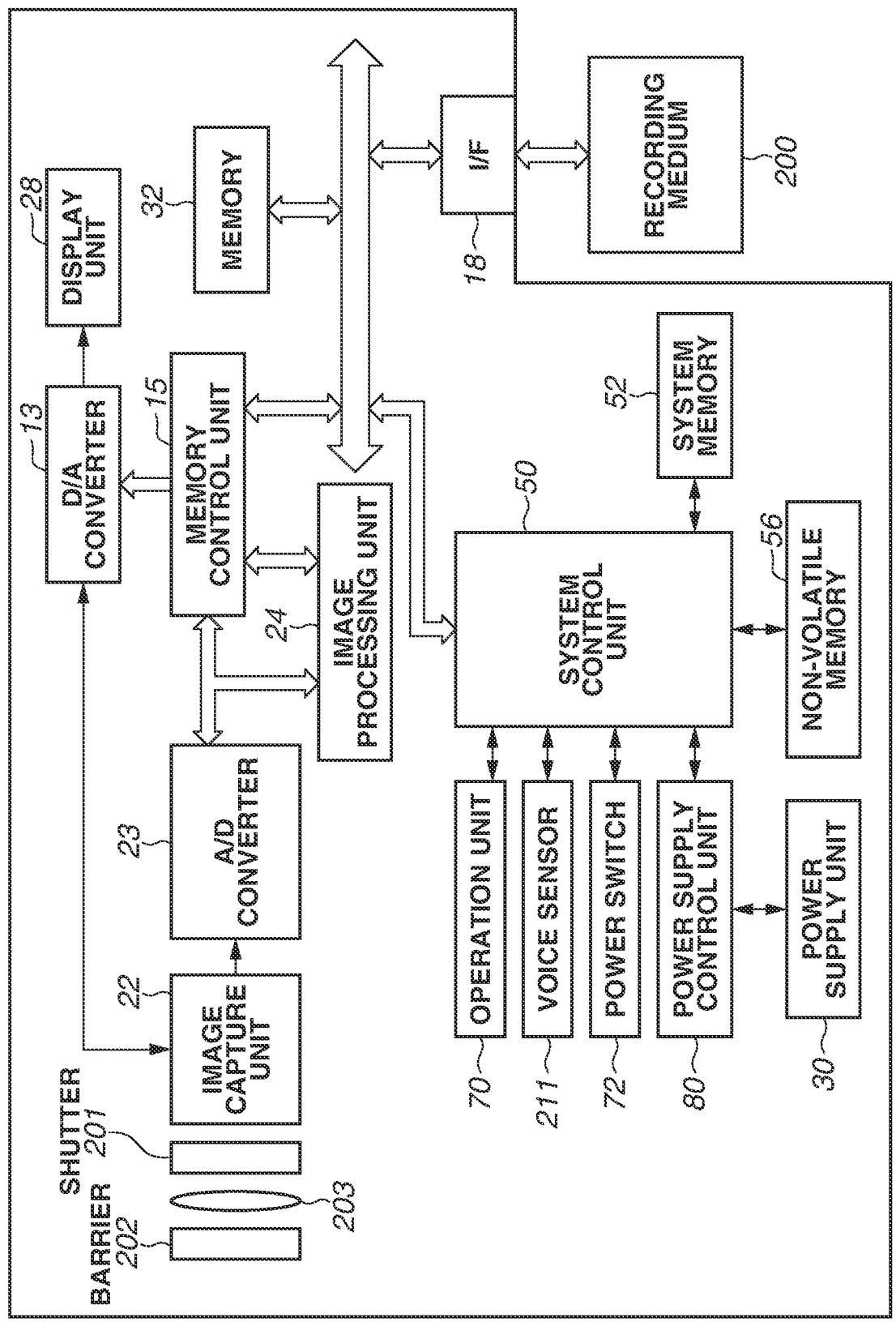
FIG. 2 is a block diagram illustrating an example of a configuration of an image capture apparatus according to an exemplary embodiment.

FIG. 2 is a block diagram illustrating an example of a configuration of the image capture apparatus 101 according to the present exemplary embodiment. The image capture apparatus 101 is implemented by a digital camera, a surveillance camera, a smartphone, or the like. An image capturing lens 203 includes a focus lens. A shutter 201 has an aperture function. An image capture unit 22 includes a charge-coupled device (CCD) element, a complementary metal-oxide-semiconductor (CMOS) element, or the like that converts an optical image into an electrical signal. An analog-to-digital (A/D) converter 23 converts an analog signal into a digital signal. The A/D converter 23 is used to convert an analog signal output from the image capture unit 22 into a digital signal. A barrier 202 covers an image capture system including the image capturing lens 203 in the image capture apparatus 101, thereby preventing contamination of and damage to the image capture system including the image capturing lens 203, the shutter 201, and the image capture unit 22. An image processing unit 24 performs predetermined resizing processing, such as pixel interpolation and reduction, and color conversion processing on data from the A/D converter 23 or data from a memory control unit 15. In addition, the image processing unit 24 performs predetermined calculation processing using captured image data. Based on the obtained calculation result, a system control unit 50 performs exposure control and distance measurement control. With this operation, through-the-lens (TTL) auto focus (AF) processing, auto exposure (AE) processing, and flash preliminary emission (EF) processing are performed. Furthermore, the image processing unit 24 performs predetermined calculation processing using captured image data to perform TTL auto white balance (AWB) processing based on the obtained calculation result. Output data from the A/D converter 23 is directly written into a memory 32 via the image processing unit 24 and the memory control unit 15, or via the memory control unit 15. The memory 32 stores image data generated by image capture processing, more specifically, image data generated by obtaining image data using the image capture unit 22 and by converting the obtained data into digital data using the A/D converter 23, and stores image data to be displayed on a display unit 28. The memory 32 has a sufficient storage capacity to store a predetermined number of still images, and moving images and voice data of a predetermined time. In addition, the memory 32 serves as a memory for image display (video memory). A digital-to-analog (D/A) converter 13 converts the image data for display stored in the memory 32 into an analog signal and supplies the signal to the display unit 28. In this way, the image data for display written in the memory 32 is displayed by the display unit 28 via the D/A converter 13. The display unit 28 performs display on a liquid crystal display (LCD) and the like according to the analog signal from the D/A converter 13. A non-volatile memory 56 is an electrically erasable and recordable memory and, for example, an electrically erasable programmable read-only memory (EEPROM). The non-volatile memory 56 stores constants, a program, and the like for an operation of the system control unit 50. The program mentioned here is a program for executing the flowcharts to be described below in the present exemplary embodiment. The system control unit 50 controls the entire image capture apparatus 101. By executing the program recorded in the non-volatile memory 56 described above, the system control unit 50 implements each processing to be described below in the present exemplary embodiment. A system memory 52 is a random-access memory (RAM). In the system memory 52, the constants and variables for the operation of the system control unit 50, the program read from the non-volatile memory 56, and the like are developed. A voice sensor 211 detects ambient sounds.

An operation unit 70 includes operation members for receiving various user operations, such as various switches, buttons, and a touchscreen. A power switch 72 turns on and off power of the image capture apparatus 101. A power supply control unit 80 includes a battery detection circuit, a direct-current-to-direct-current (DC-DC) converter, a switch circuit that switches blocks to which power is applied, and the like. The power supply control unit 80 detects whether a battery is installed, a battery type, and a remaining battery level. In addition, the power supply control unit 80 controls the DC-DC converter based on a result of the detection and an instruction from the system control unit 50, and supplies a necessary voltage to each of the units including a recording medium 200 for a necessary time period. A power supply unit 30 includes a primary battery, such as an alkaline battery or a lithium battery; a secondary battery, such as a nickel-cadmium (NiCd) battery, a nickel metal hydride (NiMH) battery, or a lithium (Li) battery; an alternating current (AC) adapter, or the like. An interface 18 is an interface with the recording medium 200, such as a memory card or a hard disk. The recording medium 200 includes a semiconductor memory, a magnetic disk, and the like.

FIG. 3 is a block diagram illustrating an example of a configuration of the electronic apparatus 102. The electronic apparatus 102 is implemented by a smartphone, a tablet terminal, a personal computer, or the like. A control unit 301 controls the entire electronic apparatus 102 and is, for example, a central processing unit (CPU). A read only memory (ROM) 302 stores programs and parameters that do not need to be changed. A RAM 303 temporarily stores programs and data supplied from an external apparatus or the like. An external storage device 304 is a hard disk, a memory card, or the like fixedly installed in an apparatus 300. An operation input interface 305 is an interface with an input device 309 that receives a user operation and inputs data. A display interface 306 is an interface with a display 310 that displays data held by the electronic apparatus 102 or supplied data. A network interface 307 is an interface for connecting to a network line 311, such as the Internet. A device interface 308 is an interface for communicating with an external device 312, such as the image capture apparatus 101. A system bus 313 is a bus that connects the respective units 301 to 308 communicably. The input device 309 and the display 310 are configured as an integrated touch screen.

FIG. 4 is a flowchart illustrating an example of an operation of image capture and record processing by the image capture apparatus 101. The following operation is implemented by the system control unit 50 reading a program from the non-volatile memory 56 and controlling each of the units according to the read program.

In S401, the system control unit 50 acquires a live image via the image capture unit 22. In S402, the system control unit 50 performs image recognition processing. In S403, the system control unit 50 determines whether a result of the image recognition processing satisfies a scene condition for automatic capturing stored in the recording medium 200. When the condition is satisfied (YES in S403), the processing proceeds to S404. In S404, the system control unit 50 performs image capture processing to generate an image file. In S405, the system control unit 50 records the image file in the recording medium 200 in association with image capture trigger information indicating that the image capture trigger type is automatic capturing. When the condition is not satisfied (NO in S403), the processing proceeds to S406. In S406, it is determined whether an image capture instruction from an image capturing person is received. For example, when the voice sensor 211 detects that an image capturing person emits a predetermined voice, it is determined that an image capture instruction is received. Alternatively, when an image capture instruction command is received from the electronic apparatus 102, it is determined that an image capture instruction is received. When an image capture instruction is received from an image capturing person (YES in S406), the processing proceeds to S407. In S407, image capture processing is performed to generate an image file. In S408, the image file is recorded in the recording medium 200 in association with the image capture trigger information which indicates manual capturing. When an image capture instruction command is received from the electronic apparatus 102, the image capture trigger information which indicates remote manual capturing is recorded. When a voice instruction is received, the image capture trigger information which indicates voice manual capturing is recorded. The image capture trigger information is recorded as data in the image file. Alternatively, the image capture trigger information may be recorded in an area separate from the image file in association with the image file.

FIG. 5 illustrates an example of a screen of an application software program that displays on the electronic apparatus 102 an image recorded in the recording medium 200 of the image capture apparatus 101.

When a user presses an image capture button 506 on a basic screen 501, the basic screen 501 is switched to a remote capture screen 504 to produce display. When the user presses a playback button 507 on the basic screen 501, the electronic apparatus 102 transmits an image viewing request to the image capture apparatus 101. The electronic apparatus 102 then acquires a thumbnail image corresponding to an image stored in the recording medium 200 of the image capture apparatus 101, and switches the basic screen 501 to an image list screen 502 for display.

The image list screen 502 includes a return button 508 for transitioning to a previous screen, an image list display area 509, and image display areas 510-1 to 510-N. In the image list display area 509, thumbnail images corresponding to all images stored in the recording medium 200 of the image capture apparatus 101, more specifically, both thumbnail images corresponding to automatically captured images and thumbnail images corresponding to manually captured images are mixed and displayed in descending order of image capture date and time. The display in descending order of image capture date and time means that an image having the latest image capture date and time is displayed in an upper left of the image list display area 509.

On the image list screen 502, when one thumbnail image is selected by a pressing operation of the user, a single image display screen 503 for displaying an image corresponding to the thumbnail image is displayed. On the single image display screen 503, the image corresponding to the thumbnail image selected on the image list screen 502 is displayed in a single image display area 513. The single image display screen 503 includes an image return button 514 for switching to an immediately preceding image in the order of image capture date and time and displaying the single image, and an image feed button 515 for switching to an immediately succeeding image in the order of image capture date and time and displaying the single image. Thumbnail images in the image display areas 510-2 and 510-3 on the image list screen 502 each correspond to a remotely captured image. Other thumbnail images in the image display area 510-1 and the like each correspond to an automatically captured image. In the single image display area 513, every time the image return button 514 or the image feed button 515 is pressed, one of all images stored in the recording medium 200 of the image capture apparatus 101 is switched to the previous or subsequent image for display. In other words, on the single image display screen 503 that transitions from the image list screen 502, images in which remotely captured images and automatically captured images are mixed are sequentially switched and displayed in the single image display area 513. On the single image display screen 503, by flicking the single image display area 513 left and right, an operation similar to pressing the image return button 514 and the image feed button 515 can be implemented.

The remote capture screen 504 includes a live view area 516, an image display area 517, and an image capture instruction button 518. The live view area 516 receives and displays a live image to be captured by the image capture apparatus 101 in real time. This allows the image capturing person to give an image capture instruction at an arbitrary timing while checking the live image displayed in the live view area 516. The image capture instruction button 518 is an item for receiving an image capture instruction from the user. When the image capture instruction button 518 is pressed, the electronic apparatus 102 transmits a remote capture instruction to the image capture apparatus 101. The image display area 517 displays a thumbnail image corresponding to the latest image among the images captured by the image capture apparatus 101 in response to a remote capture instruction and recorded in the recording medium 200. When the thumbnail image in the image display area 517 is pressed, a single image display screen 505 for displaying a single image corresponding to the thumbnail image is displayed. The single image display screen 505 is similar in configuration to the single image display screen 503. However, on the single image display screen 503 that transitions from the image list screen 502, all images recorded in the recording medium 200 of the image capture apparatus 101 including manually captured images and automatically captured images are targeted for display. On the other hand, on the single image display screen 505 that transitions from the remote capture screen 504, only remotely manually captured images are targeted for display. Thus, on the single image display screen 505, by repeatedly pressing the image return button 519 or the image feed button 520, the images corresponding to the thumbnail images in the image display areas 510-2 and 510-3 are switched and displayed sequentially, but the image corresponding to the thumbnail image in the image display area 510-1 is not displayed.

Figure 6A:
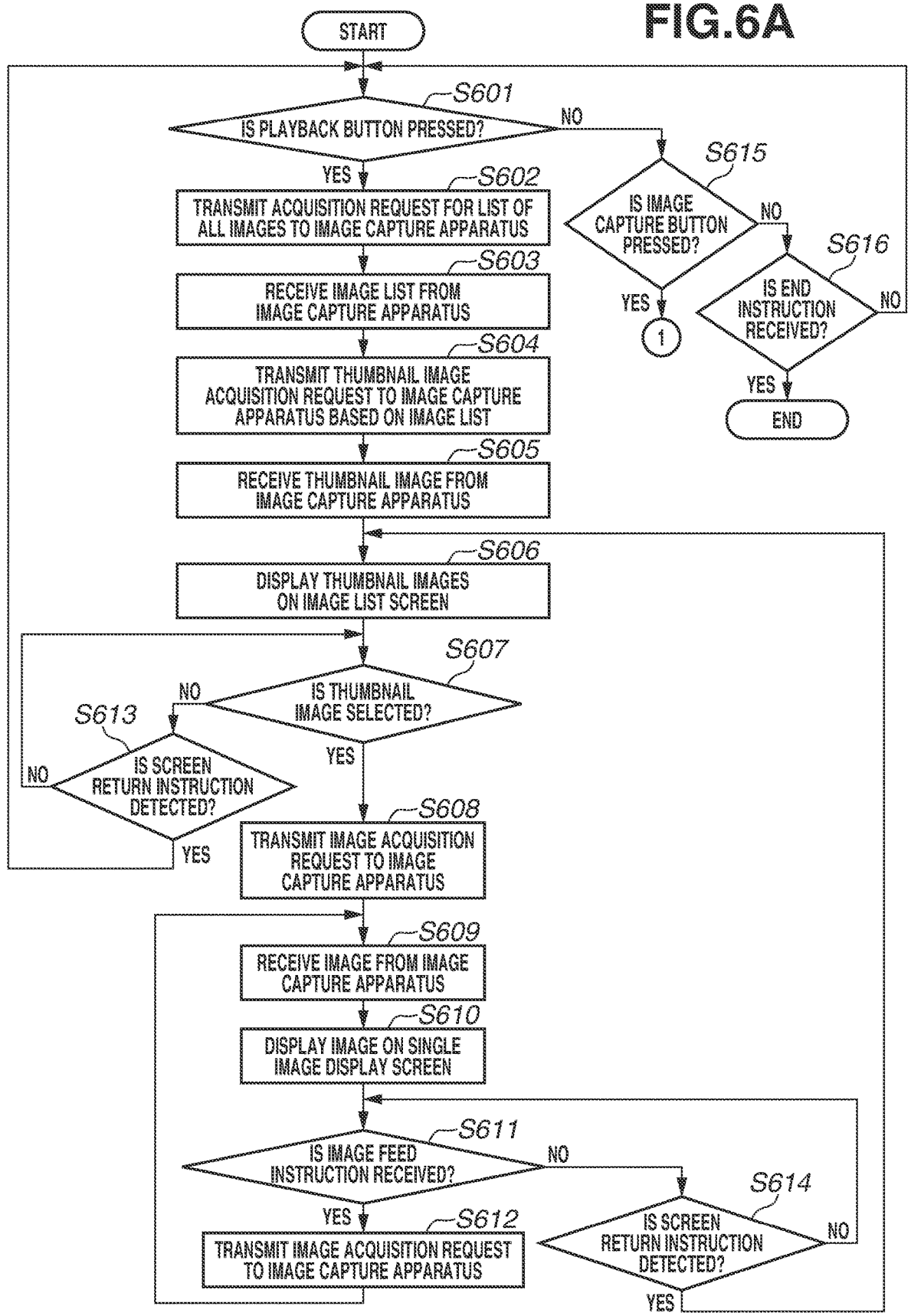

FIGS. 6A and 6B are flowcharts illustrating processing for displaying the single image display screens 503 and 505 in the image capture system 100, respectively.

In S601, the electronic apparatus 102 activates an application software program, displays the basic screen 501 on the display 310, and determines whether the playback button 507 is pressed by a user. When the playback button 507 is pressed (YES in S601), then in S602, the electronic apparatus 102 transmits an acquisition request for a list of all images to the image capture apparatus 101. In response to the acquisition request, the image capture apparatus 101 generates an image list including file paths as identifiers that identify all respective images stored in the recording medium 200. The image capture apparatus 101 then transmits the image list to the electronic apparatus 102. In S603, the electronic apparatus 102 receives the image list from the image capture apparatus 101. Here, "all images" refers to images recorded with any image capture trigger information, more specifically, images including both automatically captured images and manually captured images.

In S604, the electronic apparatus 102 designates a file path described in the image list and transmits a thumbnail image acquisition request for each of the images to the image capture apparatus 101. In response to the thumbnail image acquisition request, the image capture apparatus 101 reads a thumbnail image of the image corresponding to the designated file path from the recording medium 200 and transmits the thumbnail image to the electronic apparatus 102. In S605, the electronic apparatus 102 receives the thumbnail image from the image capture apparatus 101. The electronic apparatus 102 repeats processing of S604 and S605 by the number of file paths described in the image list, and receives thumbnail images of all the images from the image capture apparatus 101. Then in S606, the electronic apparatus 102 arranges the thumbnail images in the image display areas 510 and displays the image list screen 502. Among the plurality of thumbnail images received in S605, the thumbnail images that can be arranged in the image list display area 509 are displayed. The arranged thumbnail images are updated by a scroll operation.

When the electronic apparatus 102 detects that one of the thumbnail images in the image display areas 510 is selected by a pressing operation of the user (YES in S607), then in S608, the electronic apparatus 102 designates a file path corresponding to the thumbnail image and transmits an image acquisition request to the image capture apparatus 101. In response to the image acquisition request, the image capture apparatus 101 reads an image corresponding to the designated file path from the recording medium 200 and transmits the image to the electronic apparatus 102. In S609, the electronic apparatus 102 receives the image from the image capture apparatus 101. In S610, the electronic apparatus 102 displays the image on the single image display screen 503. Here, the electronic apparatus 102 may display the image so that the image capture trigger type of each image can be identified. For example, the electronic apparatus 102 may display an icon indicating the image capture trigger type near the single image display area 513, or display a different color frame for each image capture trigger type in the single image display area 513.

When the electronic apparatus 102 receives an image feed instruction from the user performing a pressing operation on the image return button 514 or the image feed button 515 (YES in S611), then in S612, the electronic apparatus 102 transmits an image acquisition request to the image capture apparatus 101 by designating a file path of the image before or after the currently displayed image in the image list. Then, the processing in and after S609 is performed.

When the electronic apparatus 102 detects that no thumbnail image is selected (NO in S607) and then detects a screen return instruction from the user performing a pressing operation on the return button 508 of the image list screen 502 (YES in S613), the processing returns to S601.

When the electronic apparatus 102 receives no image feed instruction (NO in S611) and then detects a screen return instruction from the user performing a pressing operation on the return button 508 of the single image display screen 503 (YES in S614), the processing returns to S606.

When the image capture button 506 is pressed (YES in S615), then in S622, the electronic apparatus 102 transmits to the image capture apparatus 101 an acquisition request for a list of images whose image capture trigger information indicates remote manual capturing. In response to the acquisition request, the image capture apparatus 101 generates an image list including file paths of respective images whose image capture trigger information indicates remote manual capturing among the images stored in the recording medium 200. The image capture apparatus 101 then transmits the image list to the electronic apparatus 102. In S623, the electronic apparatus 102 receives the image list from the image capture apparatus 101.

In S624, the electronic apparatus 102 designates a file path of the latest captured image among the file paths described in the image list, and transmits a thumbnail image acquisition request to the image capture apparatus 101. In response to the thumbnail image acquisition request, the image capture apparatus 101 reads a thumbnail image of the image corresponding to the designated file path from the recording medium 200 and transmits the thumbnail image to the electronic apparatus 102. In S625, the electronic apparatus 102 receives the thumbnail image from the image capture apparatus 101. In S626, the electronic apparatus 102 arranges the thumbnail image in the image display area 517 and displays the remote capture screen 504. Since one thumbnail image is displayed in the image display area 517, S624 and S625 are performed once without repetition.

When the electronic apparatus 102 detects that the thumbnail image in the image display area 517 is selected by a pressing operation of the user (YES in S627), then in S628, the electronic apparatus 102 designates a file path corresponding to the thumbnail image and transmits an image acquisition request to the image capture apparatus 101. In response to the image acquisition request, the image capture apparatus 101 reads an image corresponding to the designated file path from the recording medium 200 and transmits the image to the electronic apparatus 102. In S629, the electronic apparatus 102 receives the image from the image capture apparatus 101. In S630, the electronic apparatus 102 displays the image on the single image display screen 505.

When the electronic apparatus 102 receives an image feed instruction from the user performing a pressing operation on the image return button 519 or the image feed button 520 (YES in S631), then in S632, the electronic apparatus 102 designates a file path of the image before or after the currently displayed image in the image list, and transmits an image acquisition request to the image capture apparatus 101. Then, the processing in and after S629 is performed.

When the electronic apparatus 102 detects that no thumbnail image is selected (NO in S627) and then detects a screen return instruction from the user performing a pressing operation on the return button 508 of the remote capture screen 504 (YES in S633), the electronic apparatus 102 displays the basic screen 501 and the processing returns to S601.

When the electronic apparatus 102 receives no image feed instruction (NO in S631) and then detects a screen return instruction from the user performing a pressing operation on the return button 508 of the single image display screen 505 (YES in S634), the processing returns to S626.

When the image capture button 506 is not pressed (NO in S615), then in S616, the electronic apparatus 102 determines whether an end instruction is received. When an end instruction is received (YES in 616), the processing ends. When no end instruction is received (NO in S616), the processing returns to S601.

In the present exemplary embodiment, in S622, the electronic apparatus 102 may transmit an acquisition request for a list of images whose image capture trigger information indicates not only remote manual capturing but also voice manual capturing to the image capture apparatus 101.

In S605, the electronic apparatus 102 may receive the image capture trigger information together with the thumbnail image, and then display each of the thumbnail images on the image list screen 502 so as to be distinguishable between automatic capturing and remote manual capturing.

In FIG. 5, the thumbnail images corresponding to remote manual capturing are displayed with a bold frame. Alternatively, a mark indicating automatic capturing or remote manual capturing may be displayed near each of the thumbnail images.

Manual capturing may be implemented by receiving not only the remote capture instruction and the voice capture instruction described above, but also a user's capture instruction using another method, such as a pressing operation on a capture button provided in the image capture apparatus 101.

The user may manually set the conditions of the scene for which automatic capturing is performed, or the setting may be automatically performed by using a technique, such as deep learning.

The present exemplary embodiment is similarly applicable to both still images and moving images. In addition, the present exemplary embodiment is similarly applicable to a case where other content is recorded, such as a case where a voice is automatically recorded or manually recorded instead of an image.

The present exemplary embodiment has described, in S622, a case where when the electronic apparatus 102 transmits an image list acquisition request, the image capture apparatus 101 generates an image list including file paths of manually captured images based on image capture trigger information, and transmits the image list to the electronic apparatus 102. Alternatively, the image capture apparatus 101 may generate an image list including file paths and image capture trigger information of all images and transmit the image list to the electronic apparatus 102. In this case, in S624, the electronic apparatus 102 needs to designate a file path of an image whose image capture trigger information indicates remote manual capturing, and transmit an image acquisition request.

The present exemplary embodiment has described a playback mode as an example of a mode different from a manual image capture mode. However, other modes can be included in modes in which the electronic apparatus 102 operates.

The present exemplary embodiment has described a case where the image capture apparatus 101 and the electronic apparatus 102 are configured as separate apparatuses, but may be implemented by one apparatus.

As described above, according to the present exemplary embodiment, in the playback mode, both automatically captured images and remotely manually captured images are displayed in a mixed manner. When the electronic apparatus 102 is operating in the playback mode, since the user has time to view images, the user can find a desired image among many displayed images, which include automatically captured images. On the other hand, according to the present exemplary embodiment, in the manual image capture mode, only manually captured images are displayed. When the electronic apparatus 102 is operating in the remote manual capture mode, the user mainly performs a capture operation and has no enough time to view images. Thus, while the user is manually capturing an image, automatically captured images are not displayed. Therefore, the user can easily find a desired image in a short time from images that are intentionally captured and remembered by the user.

According to the present exemplary embodiment, when images captured by an image capture apparatus capable of performing both manual capturing and automatic capturing are displayed, while manual capturing is performed, an automatically captured image is not displayed and a manually captured image is displayed. Therefore, only the image intentionally captured by the user is displayed, thereby producing an effect that the searchability of the user's desired image improves.

OTHER EMBODIMENTS

Some embodiments can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-158669, which was filed on Aug. 30, 2019 and which is hereby incorporated by reference herein in its entirety.

What is claimed is:

1. An electronic apparatus connected to an image capture apparatus, the electronic apparatus comprising:
   an instruction unit configured to receive an image capture instruction for requesting the image capture apparatus to perform image capture processing, in response to a user operation;
   a request unit configured to transmit an acquisition request for acquiring an image, to the image capture apparatus, the image being recorded by the image capture apparatus performing the image capture processing either according to a capture request based on the image capture instruction from the electronic apparatus or according to satisfying a predetermined condition for automatic capturing;
   a reception unit configured to receive the image from the image capture apparatus; and
   a display control unit configured to perform control to display the received image on a screen,
   wherein, if the instruction unit receives the image capture instruction, a first image recorded by the image capture apparatus performing the image capture processing according to the capture request based on the image capture instruction is displayed on the screen without a second image recorded by the image capture apparatus automatically performing the image capture processing according to satisfying the predetermined condition, and wherein, if the instruction unit does not receive the image capture instruction, both the first image and the second image are displayed on the screen.

2. The electronic apparatus according to claim 1, wherein the display control unit performs control in such a manner that a plurality of the first images is sequentially switched and displayed one by one on the screen.

3. The electronic apparatus according to claim 1, wherein the request unit transmits an acquisition request for acquiring a first thumbnail image corresponding to the first image to the image capture apparatus if the electronic apparatus operates in a mode where the image capture instruction can be received by the instruction unit, the reception unit receives the first thumbnail image from the image capture apparatus, and the display control unit performs control to display the first thumbnail image on the screen together with an item for receiving the image capture instruction in response to the user operation.

4. The electronic apparatus according to claim 3, wherein the reception unit receives the first image when a user operation on the displayed first thumbnail image is received.

5. The electronic apparatus according to claim 1, wherein the request unit transmits an acquisition request for a thumbnail image corresponding to the image to the image capture apparatus, the reception unit receives the thumbnail image from the image capture apparatus, and the display control unit performs control to list and display a plurality of the thumbnail images on the screen if the electronic apparatus does not operate in a mode where the image capture instruction can be received by the instruction unit.

6. The electronic apparatus according to claim 5, wherein the reception unit receives the image when a user operation on one of the plurality of the displayed thumbnail images is received.

7. The electronic apparatus according to claim 5, wherein the display control unit performs control to display the thumbnail image in such a manner that can identify whether the displayed thumbnail image corresponds to the first image or the second image.

8. The electronic apparatus according to claim 1, wherein the display control unit performs control to display the image in such a manner that can identify whether the image is recorded by the image capture apparatus performing the image capture processing according to the capture request based on the image capture instruction or recorded by the image capture apparatus automatically performing the image capture processing according to satisfying the predetermined condition.

9. The electronic apparatus according to claim 8, further comprising an acquisition unit configured to acquire, from the image capture apparatus, a list including an identifier that identifies the image recorded by the image capture apparatus performing the image capture processing according to the capture request based on the image capture instruction or the image recorded by the image capture apparatus automatically performing the image capture processing according to satisfying the predetermined condition.

10. The electronic apparatus according to claim 1, wherein the image capture instruction includes at least one of a remote manual capturing instruction, a voice manual capturing instruction, and a manual capturing instruction by operating the image capture apparatus.

11. An image capture apparatus connected to an electronic apparatus, the image capture apparatus comprising:
a first recording unit configured to record a first image in a recording medium in association with trigger information indicating manual capturing, the first image being obtained by image capture processing performed according to a user instruction;
a second recording unit configured to record a second image in the recording medium in association with trigger information indicating automatic capturing, the second image being obtained by the image capture processing performed when a predetermined condition is satisfied;
a reception unit configured to receive an acquisition request for at least one of the first image and the second image from the electronic apparatus;
a reading unit configured to read at least one of the first image and the second image from the recording medium according to the received acquisition request; and
a transmission unit configured to transmit at least one of the read first image and the read second image to the electronic apparatus.

12. A storage medium configured to store a program that causes a computer to function as each of the units in the electronic apparatus according to claim 1.

13. A storage medium configured to store a program that causes a computer to function as each of the units in the image capture apparatus according to claim 11.

14. A method for controlling an electronic apparatus connected to an image capture apparatus, the method comprising:
receiving an image capture instruction for requesting the image capture apparatus to perform image capture processing, in response to a user operation;
transmitting an acquisition request for acquiring an image, to the image capture apparatus, the image being recorded by the image capture apparatus performing the image capture processing either according to a capture request based on the image capture instruction from the electronic apparatus or according to satisfying a predetermined condition for automatic capturing;
receiving the image from the image capture apparatus; and
performing control to display the received image on a screen,
wherein, if the image capture instruction is received, a first image recorded by the image capture apparatus performing the image capture processing according to the capture request based on the image capture instruction is displayed on the screen without a second image recorded by the image capture apparatus automatically performing the image capture processing according to satisfying the predetermined condition, and
wherein, if the image capture instruction is not received, both the first image and the second image are displayed on the screen.

15. A method for controlling an image capture apparatus connected to an electronic apparatus, the method comprising:
performing image capture processing according to a user instruction and recording a first image obtained by the image capture processing in a recording medium in association with trigger information indicating manual capturing;

performing the image capture processing when a predetermined condition is satisfied and recording a second image obtained by the image capture processing in the recording medium in association with trigger information indicating automatic capturing;
receiving an acquisition request for at least one of the first image and the second image from the electronic apparatus;
reading at least one of the first image and the second image from the recording medium according to the received acquisition request; and
transmitting at least one of the read first image and the read second image to the electronic apparatus.

16. An electronic apparatus connected to an image capture apparatus, the electronic apparatus comprising:
a processor; and
a memory storing a program which, when executed by the processor, causes the electronic apparatus to:
perform control to operate in a first mode or a second mode which differs from the first mode;
allow the electronic apparatus to accept an image capture instruction for requesting the image capture apparatus to perform image capture processing, in response to a user operation, when operating in the first mode;
transmit the image capture instruction to the image capture apparatus;
receive images from the image capture apparatus, each of the images being generated by the image capture apparatus performing the image capture processing either according to the image capture instruction transmitted from the electronic apparatus or according to satisfaction of a predetermined condition for automatic capturing; and
perform control to display the received images on a screen, such that a first image generated by the image capture apparatus performing the image capture processing according to the image capture instruction is displayed on the screen without a second image generated by the image capture apparatus performing the image capture processing automatically according to the satisfaction of the predetermined condition when operating in the first mode, and both the first image and the second image are displayed simultaneously on the screen when operating in the second mode.

17. The electronic apparatus according to claim 16, wherein, when operating in the first mode, the first image is displayed with a live image captured and transmitted by the image capture apparatus in real time.

18. The electronic apparatus according to claim 16, wherein the program, when executed by the processor, further causes the electronic apparatus to:
allow the electronic apparatus to accept an acquisition instruction for requesting information about images stored in a recording medium of the image capture apparatus from the image capture apparatus, in response to a user operation, when operating in the second mode;
transmit the acquisition instruction to the image capture apparatus; and
receive the information about the images from the image capture apparatus.

19. A method for controlling an electronic apparatus connected to an image capture apparatus, the method comprising:
performing control to operate the electronic apparatus in a first mode or a second mode which differs from the first mode;
allowing the electronic apparatus to accept an image capture instruction for requesting the image capture apparatus to perform image capture processing, in response to a user operation, when operating in the first mode;
transmitting the image capture instruction to the image capture apparatus;
receiving images from the image capture apparatus, each of the images being generated by the image capture apparatus performing the image capture processing either according to the image capture instruction transmitted from the electronic apparatus or according to satisfaction of a predetermined condition for automatic capturing; and
performing control to display the received images on a screen, such that a first image generated by the image capture apparatus performing the image capture processing according to the image capture instruction is displayed on the screen without a second image generated by the image capture apparatus performing the image capture processing automatically according to the satisfaction of the predetermined condition when operating in the first mode, and both the first image and the second image are displayed simultaneously on the screen when operating in the second mode.

20. A non-transitory computer-readable storage medium storing a program that, when executed by a processor, causes the processor to perform operations comprising:
performing control to operate an electronic apparatus in a first mode or a second mode which differs from the first mode;
allowing the electronic apparatus to accept an image capture instruction for requesting an image capture apparatus to perform image capture processing, in response to a user operation, when operating in the first mode;
transmitting the image capture instruction to the image capture apparatus;
receiving images from the image capture apparatus, each of the images being generated by the image capture apparatus performing the image capture processing either according to the image capture instruction transmitted from the electronic apparatus or according to satisfaction of a predetermined condition for automatic capturing; and
performing control to display the received images on a screen, such that a first image generated by the image capture apparatus performing the image capture processing according to the image capture instruction is displayed on the screen without a second image generated by the image capture apparatus performing the image capture processing automatically according to the satisfaction of the predetermined condition when operating in the first mode, and both the first image and the second image are displayed simultaneously on the screen when operating in the second mode.

* * * * *